United States Patent [19]
Koelsch et al.

[11] Patent Number: 5,321,555
[45] Date of Patent: Jun. 14, 1994

[54] COMPACT PHOTOGRAPHIC OBJECTIVE OF THE TRIPLET TYPE HAVING IMPROVED CHROMATIC AND MONOCHROMATIC CHARACTERISTICS

[75] Inventors: Lothar Koelsch, Wilnsdorf; Klaus-Dieter Schaefer, Braunfels, both of Fed. Rep. of Germany

[73] Assignee: Leica Camera GmbH, Solms, Fed. Rep. of Germany

[21] Appl. No.: 960,108

[22] Filed: Oct. 13, 1992

[30] Foreign Application Priority Data

Oct. 12, 1991 [DE] Fed. Rep. of Germany ....... 4133844

[51] Int. Cl.$^5$ ................................................. G02B 9/14
[52] U.S. Cl. ...................................... 359/786; 359/785
[58] Field of Search ............................ 359/784–786, 359/748, 753

[56] References Cited

U.S. PATENT DOCUMENTS 2,728,266 12/1955 Tolle ..................................... 359/786
5,161,065 11/1992 Ohshita ............................... 359/785

FOREIGN PATENT DOCUMENTS 544329 1/1932 Fed. Rep. of Germany .
2424343 12/1974 Fed. Rep. of Germany .
121014 7/1984 Japan ................................... 359/785

*Primary Examiner*—Loha Ben
*Assistant Examiner*—James Phan
*Attorney, Agent, or Firm*—Foley & Lardner

[57] ABSTRACT

An objective for use in photographic compact cameras has a relative aperture of 3.5 and a focal length of 35 mm, and is of the triplet type. The lens element on the object side is a cemented element. In order to achieve an extremely compact structural shape and balanced monochromatic correction, as well as a reduction in the chromatic magnification difference, the color coma and the color astigmatism, four design conditions are specified.

3 Claims, 5 Drawing Sheets

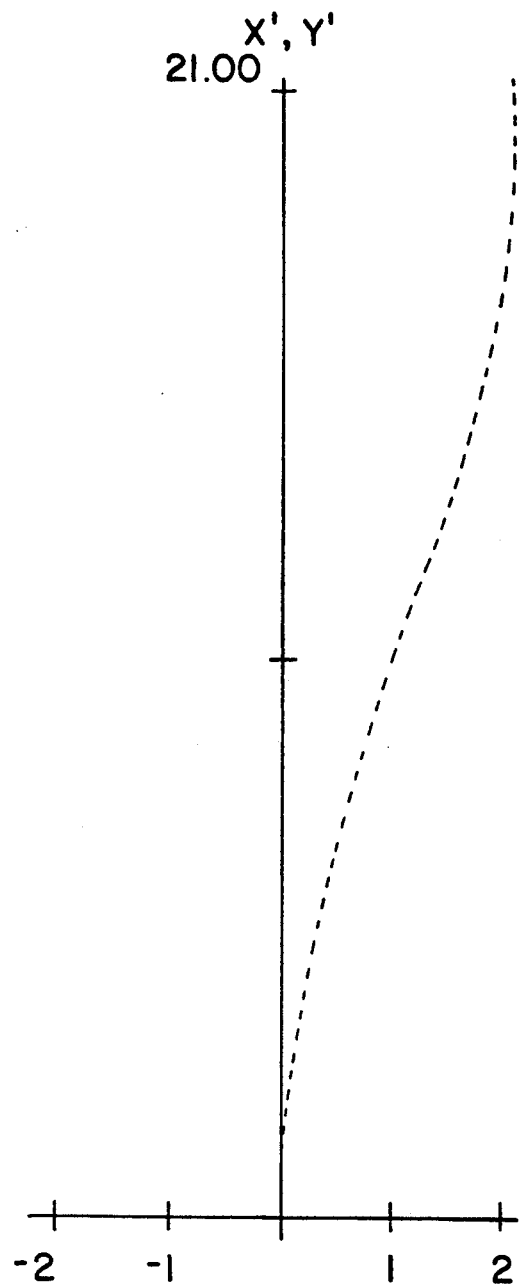

COMPACT PHOTOGRAPHIC OBJECTIVE OF THE TRIPLET TYPE HAVING IMPROVED CHROMATIC AND MONOCHROMATIC CHARACTERISTICS

BACKGROUND

The invention relates to a photographic objective having a relative aperture 3.5 and a focal length 35 of the triplet type with a rear stop, which is provided especially for compact photographic cameras.

A photographic objective of the triplet type having a rear stop is disclosed in DE 24 24 343 C2, which contains three lens elements of which the front element is a positive meniscus lens which is convex on the object side, the central lens element is a hi-concave lens, and the rear lens element is a hi-concave cemented element consisting of two lenses of opposite refractive power.

DE-PS 544,329 discloses a photographic objective comprising a diverging lens and in each case one collecting lens element, arranged in front of and behind it, of which that on the object side is constructed as a cemented element with a positive overall refractive power. This known objective has a focal length of 100 mm; there are no statements on the position of the aperture stop.

SUMMARY OF THE INVENTION

It is an object of the present invention to provide an extremely compact photographic objective of the generic type mentioned initially, having balanced monochromatic correction and a reduction in the chromatic magnification difference, the color coma and the color astigmatism. This photographic objective overall has improved imaging characteristics over known systems of this type. .

In order to achieve the above and other objects of the present invention, the photographic objective has a relative aperture of 3.5 and a focal length of 35 mm and is of the triplet type with a rear aperture stop. The objective further includes: a cemented element, including a first and a second lens element, having a positive overall refractive power on its object side; a bi-concave central lens element; and a bi-convex rear element. In order to achieve the desired objects of the invention, the objective composed of the above elements also meets four design conditions.

BRIEF DESCRIPTION OF THE DRAWINGS

The invention will be described in further detail with reference to the accompanying drawings, in which:

FIGS. 2A–D show the correction state of the objective according to an embodiment of the invention, where FIG. 2A is a distortion plot, FIG. 2B is a relative illumination intensity plot, FIG. 2C is a transverse aberrations plot, and FIG. 2D is a field curvature plot.

DETAILED DESCRIPTION OF THE PREFERRED EMBODIMENTS

Figure 1:
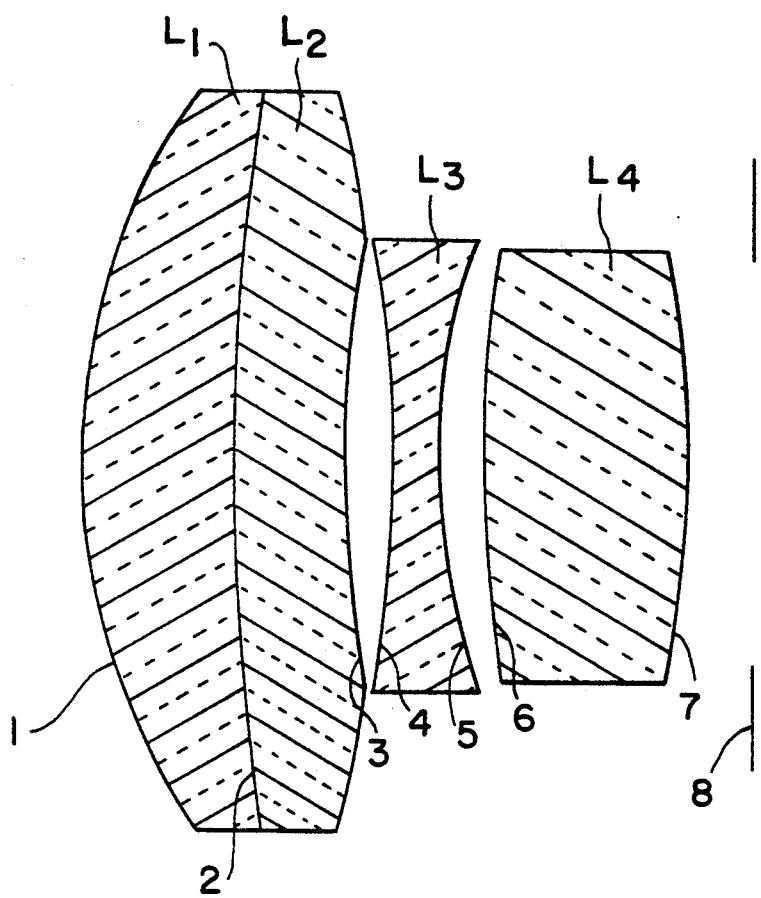
FIG. 1 shows a sectional view of an objective system according to an embodiment of the invention.

The objective shown in FIG. 1 has a first lens element $L_1$ with surfaces 1 and 2 cemented to a second lens element $L_2$ with surfaces 2 and 3 as the lens group closest to the object. The objective also has a middle lens element $L_3$ with surfaces 4 and 5, as well as a back lens element $L_5$ with surfaces 6 and 7. A rear aperture stop 8 is also shown.

The compactness of the objective is described by the condition $B_L/S' < 0.6$, where $S'_{max} = 0.8 \times f'$, where $B_L$ is the structural length of the objective, $S'$ is the distance between the back lens and the image, and $f'$ is the focal length of the objective. In order to correct for monochromatic aberrations, a high refractive index in the first lens group, corresponding to the condition $n_2 > 1.7$, where $n_2$ is the refractive index of the second lens element $L_2$, has been found to be favorable. In order to achieve the desired matching between the lens surfaces 2 and 7 while avoiding higher order aberrations, a large difference $\nu_1 - \nu_2 > 15$, where $\nu_{1,2}$ are the Abbe numbers of the first and second lens elements $L_1$, $L_2$, is essential. Finally, as a result of condition $0.7 \times F_2(7) < F_2(-2) < 1.3 \times F_2(7)$, where $F_2(2)$ and $F_2(7)$ are the Seidel coefficients for the chromatic magnification difference of the lens elements having the lens surfaces 2 and 7, respectively, the effect of the cemented surface in the first lens group is described, the final surface 7 is compensated for the effect $F_2$ (chromatic magnification difference) by means of this cemented surface. In addition, relief of stress in the second lens element is thus produced such that, here, a relatively large $\nu$ value and a relatively low refractive index are adequate, which has a positive effect on the Petzval sum. In addition, a reduction in the 3rd order aberration coefficient is achieved which has a favorable effect on the higher order monochromatic and chromatic aberrations.

The photographic objective of the present invention also has the following numeric data:

|   | r        | d       | n(546)   | ν     |
|---|----------|---------|----------|-------|
| 1 | 11.0297  | 2.7300  | 1.808109 | 46.34 |
| 2 | 39.1519  | 2.0219  | 1.812640 | 25.23 |
| 3 | 19.1519  | 0.7000  |          |       |
| 4 | −40.8013 | 1.0051  | 1.652230 | 33.57 |
| 5 | 10.4692  | 0.8000  |          |       |
| 6 | 20.7116  | 3.5430  | 1.716700 | 42.89 |
| 7 | −24.0136 | 1.2000  |          |       |
| 8 | Stop     | 24.5165 |          |       | where r(1–7) are the radii of curvature of the individual lens surfaces 1–7, d(1–6) are distances between and thicknesses of same, d(7) is the distance from the rear lens face 7 to the near aperture stop 8, d(8) is the distance from the rear aperture stop 8 to the image plane, n(1,2,4,6) are the refractive indices of the lens elements having the lens surfaces 1,2,4,6 and ν(1,2,4,6) are the corresponding Abbe numbers of these lens elements.

In addition to the numeric data mentioned above, the objective according to the invention has the following paraxial data:

$f' = 33.6323$ $S' = 26.7165$ $\beta\text{ap}' = 0.7290$ $SS' = 10.8000$ $Z' = 1.2000$ where $S'$ is the distance between the rear lens and the image, $f'$ is the focal length, $\beta\text{ap}'$ is the pupil magnification of the exit pupil, $SS'$ is the structural length between the first and the last lens vertex, Z' is the distance between the rear shutter and the last lens vertex.

Figure 2B:
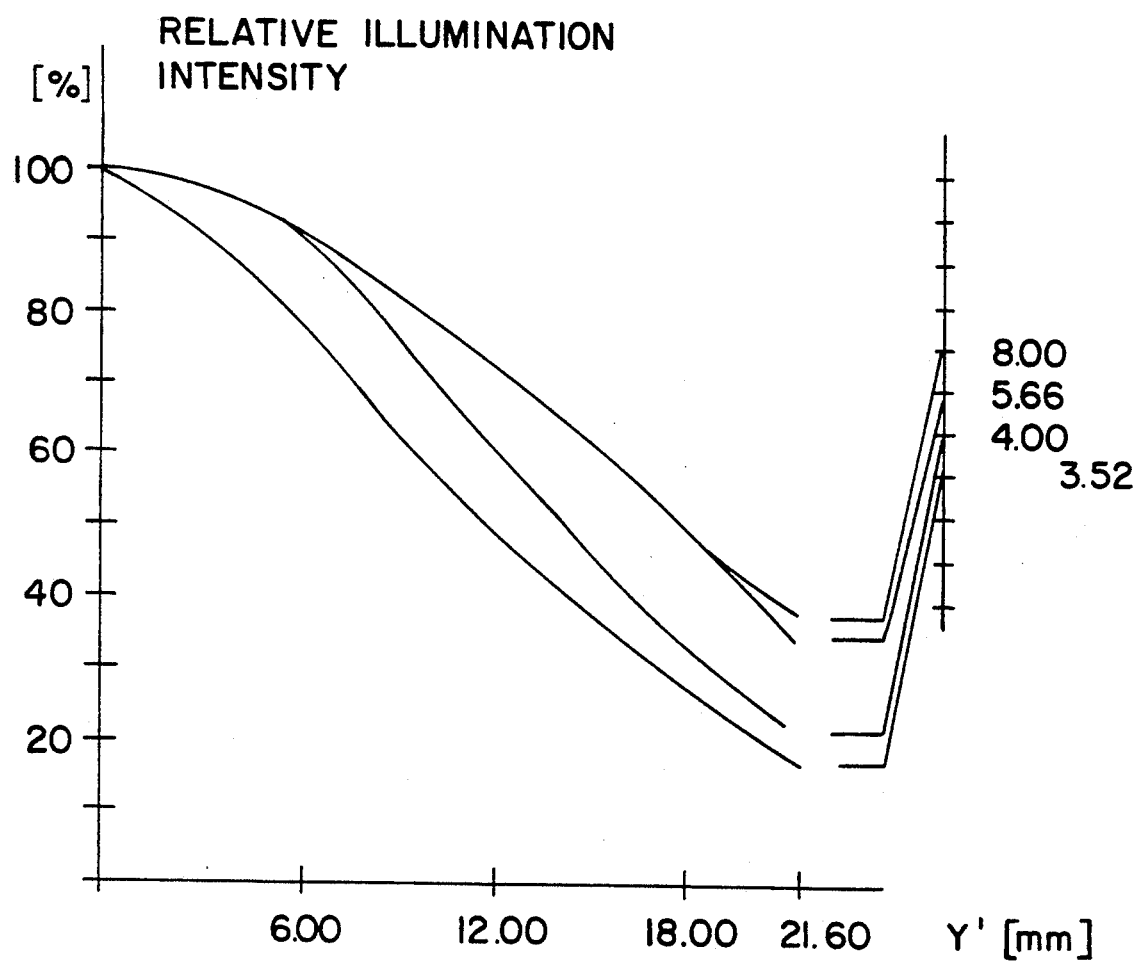
Figure 2C:
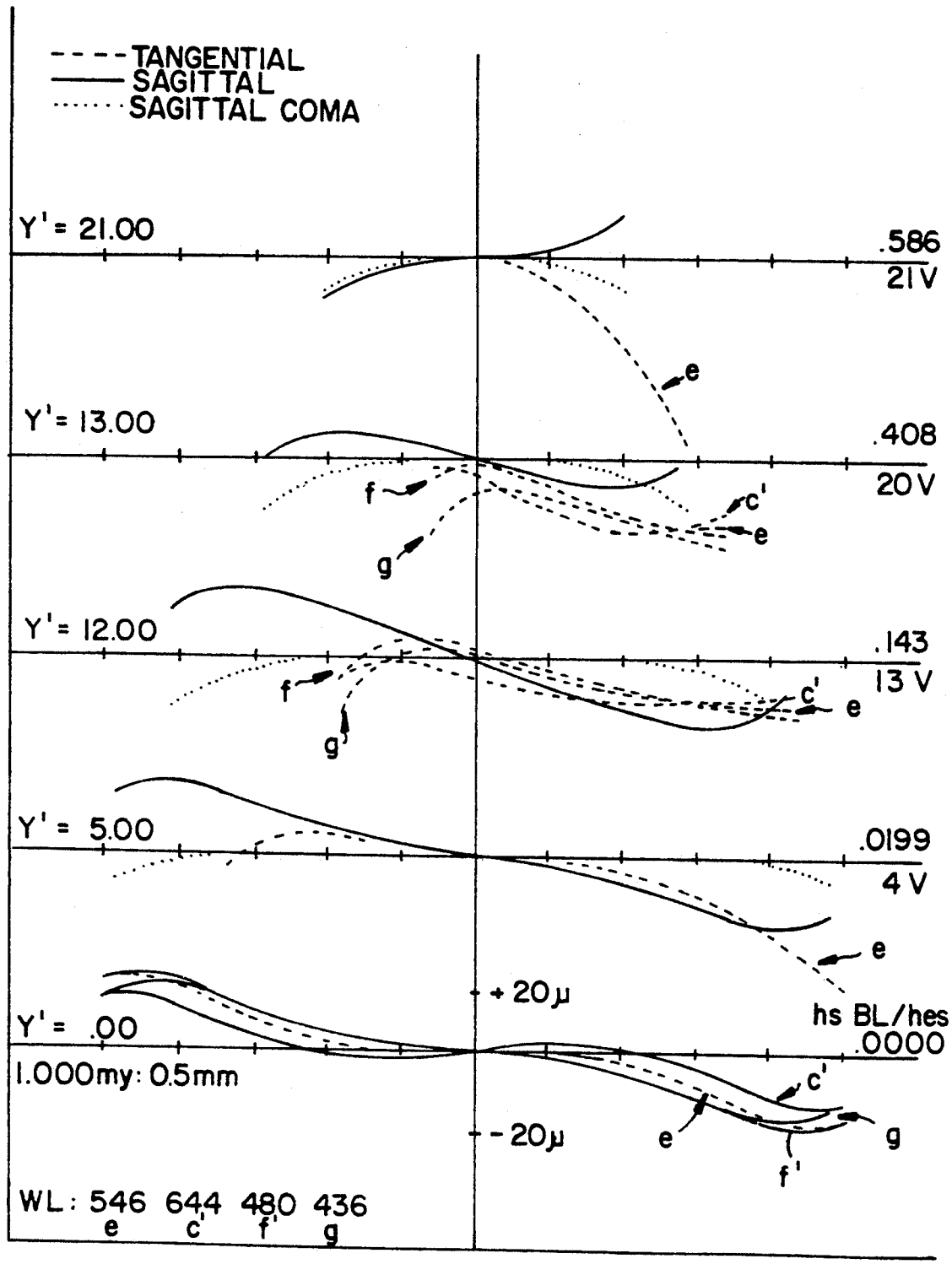
Figure 2D:
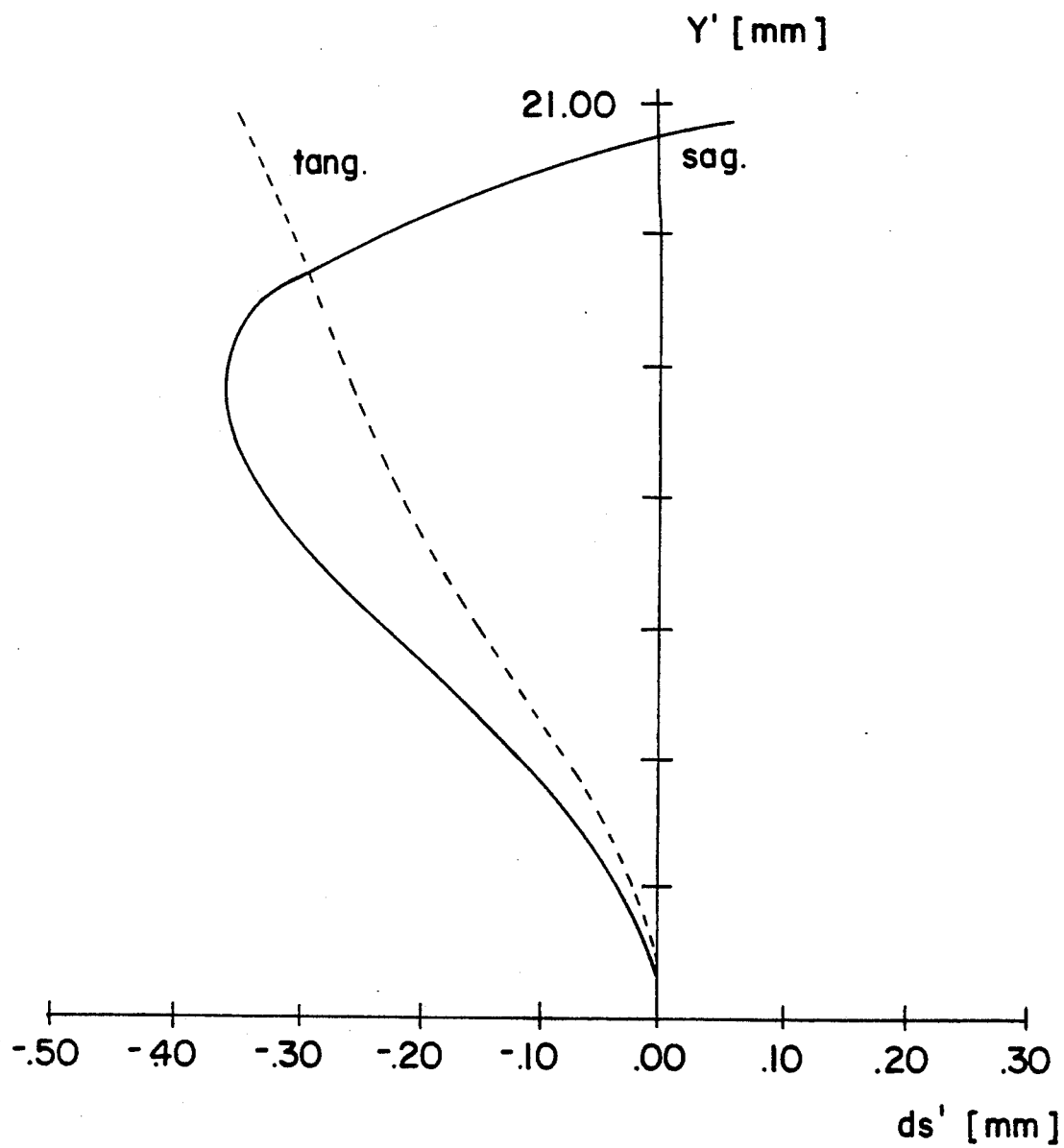

From the correction curves shown in FIG. 2, it is apparent that the objective according to the invention has a favorable monochromatic correction with an extremely compact construction, despite the use of a rear aperture stop. The objective especially has a major reduction in the chromatic magnification difference, the color coma and the color astigmatism.

It is self-evident that the numeric data may differ in the context of normal variations. Other designs within the spirit and scope of the invention will be apparent to those skilled in the field after receiving the above teachings. The invention, therefore, is defined with reference to the following claims.

What is claimed is:

1. A photographic objective having a relative aperture of 3.5 and a focal length of 35 mm, of the triplet type with a rear lens aperture stop, comprising:
    a cemented element, including a first and a second lens element, having a positive overall refractive power on its object side;
    a bi-concave central lens element; and
    a bi-convex rear lens element, wherein said photographic objective satisfies the following conditions:

$$\frac{B_L}{S'} < 0.6, \text{ where } S_{max}' = 0.8 \times f \quad (I)$$

$$n_2 > 1.7 \quad (II)$$

$$\nu_1 - \nu_2 > 15 \text{ and} \quad (III)$$

$$0.7 \times F_2(7) < F_2(2) < 1.3 \times F_2(7), \quad (IV)$$

where
where
$B_L$ is the structural length of the objective,
$S'$ is its distance between the rear lens and an image formed by said objective,
$f$ is the focal length of the objective,
$S'_{max}$ is the maximum distance between the rear lens and the image formed by said objective,
$n_2$ is the refractive index of the second lens element,
$\nu_{1,2}$ are the Abbe numbers of said first and second lens elements, and
$F_2(2)$ and $F_2(7)$ are the Seidel coefficients for the chromatic magnification difference of said cemented element having lens surface 2 and said bi-convex rear lens element having lens surface 7.

2. The photographic objective as claimed in claim 1, wherein said objective has the following numeric data:

|   | r        | d       | n(546)   | ν     |
|---|----------|---------|----------|-------|
| 1 | 11.0297  | 2.7300  | 1.808109 | 46.34 |
| 2 | 39.1519  | 2.0219  | 1.812640 | 25.23 |
| 3 | 19.1519  | 0.7000  |          |       |
| 4 | −40.8013 | 1.0051  | 1.652230 | 33.57 |
| 5 | 10.4692  | 0.8000  |          |       |
| 6 | 20.7116  | 3.5430  | 1.716700 | 42.89 |
| 7 | −24.0136 | 1.2000  |          |       |
| 8 | Stop     | 24.5165 |          |       | where
r(1-7) are the radii of curvature of the individual lens surfaces 1-7,
d(1-6) are distances between the consecutive lens surfaces 1-7,
d(7) is the distance from the final lens surface 7 to said rear aperture stop,
d(8) is the distance from said rear aperture stop to said image formed by the objective,
n(1,2,4,6) are the refractive indices at 546 nm of the lens elements having front lens surfaces 1,2,4,6, and
ν(1,2,4,6) are the corresponding Abbe numbers of the lens elements having front lens surfaces 1,2,4,6.

3. The photographic objective as claimed in claim 2, wherein said objective has the following paraxial data:

$$f = 33.6323$$

$$S' = 26.7165$$

$$\beta ap' = 0.7290$$

$$SS' = 10.8000$$

$$Z' = 1.2000$$

where
$\beta ap'$ is a pupil magnification of an exit pupil,
$SS'$ is a structural length between a first and a last lens vertex, and
$Z'$ is a distance between said rear aperture stop and said last lens vertex.

* * * * *